United States Patent [19]
Kato

[11] Patent Number: 5,379,066
[45] Date of Patent: Jan. 3, 1995

[54] HORIZONTAL REGISTER FOR CCD IMAGER

[75] Inventor: Naoki Kato, Kanagawa, Japan

[73] Assignee: Maoki Kato, Tokyo, Japan

[21] Appl. No.: 804,374

[22] Filed: Dec. 10, 1991

[30] Foreign Application Priority Data

Dec. 12, 1990 [JP] Japan ................... 2-410455

[51] Int. Cl.⁶ .............................................. H04N 5/335
[52] U.S. Cl. ...................................... 348/311; 348/302
[58] Field of Search ...................... 358/213.23, 213.11,
358/213.26, 213.27, 213.29; 357/24 LR, 24;
250/280.1; H04N 5/335; 257/254; 948/294,
302, 311, 316, 317, 318, 319

[56] References Cited

U.S. PATENT DOCUMENTS 4,633,285 12/1986 Hunsinger et al. ................ 357/26
4,807,037 2/1989 Iesaka et al. ................... 358/213.31
4,949,143 8/1990 Iesaka et al. ...................... 357/24

FOREIGN PATENT DOCUMENTS 61-126811 6/1986 Japan .......................... H03H 11/26
62-61481 3/1987 Japan .......................... H04N 5/335

Primary Examiner—Joseph Mancuso
Assistant Examiner—Tuan V. Ho
Attorney, Agent, or Firm—Hill, Steadman & Simpson

[57] ABSTRACT

The present invention is directed to a solid state image sensing device in which a transfer efficiency of a horizontal shift register is improved without decreasing an electric charge amount $Q_H$ treated by the horizontal shift register. Therefore, the solid state image sensing device becomes very useful when a peak value Ha of a transfer clock is lowered. According to an aspect of the present invention, a solid state image sensing device includes a horizontal transfer unit having a plurality of transfer electrodes formed of electrode pairs, each formed of a storage gate electrode and a transfer gate electrode and driving the plurality of transfer electrodes in two-phase fashion by the application of transfer clocks of the same phase to these electrode pairs to thereby transfer electrical charges from the vertical transfer unit to the horizontal direction. Transfer clocks of the same phase are applied directly to the transfer gate electrode and are also applied to the storage gate electrode via a resistor.

7 Claims, 4 Drawing Sheets

FIG. 5
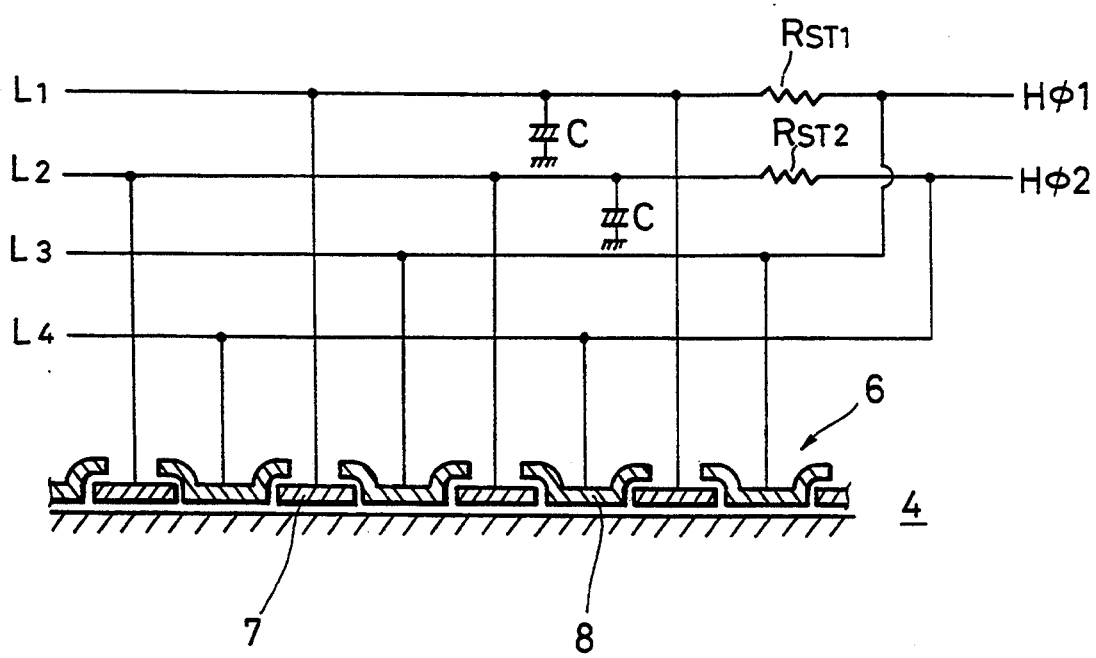
FIG. 5A
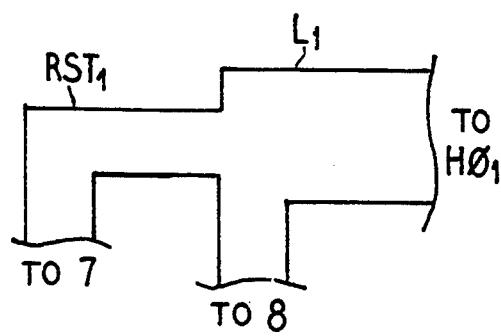
FIG. 5B
FIG. 6
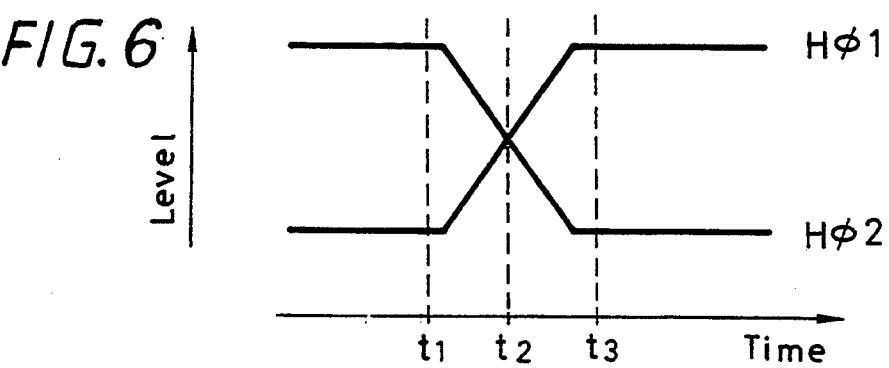

HORIZONTAL REGISTER FOR CCD IMAGER

BACKGROUND OF THE INVENTION

1. Field of the Invention

The present invention generally relates to image sensing devices and, more particularly, is directed to an image sensing device in which a transfer efficiency of a horizontal transfer unit is improved.

2. Description of the Prior Art

FIG. 1 shows a structure of a CCD (charge-coupled device) solid state image sensing device of, for example, an interline transfer system as an example of a solid state image sensing device. Referring to FIG. 1, an imager unit 3 comprises a plurality of light sensing units 1 which are arranged at the pixel units (picture element) in the vertical and horizontal directions in a two-dimensional array design. They store electric charges corresponding to a quantity of incident light. vertical shift register (vertical transfer unit) 2 is provided for transferring electric charges read out from these light sensing units 1 at every vertical column in the vertical direction. Electric charges of all pixels photoelectrically-converted by the light sensing units 1 are read out in a moment to the vertical shift registers 2 during one portion of the vertical blanking period. The electric charges transferred to the vertical shift registers 2 are transferred to a horizontal shift register (horizontal transfer unit) 4 by the amount corresponding to one scanning line during one portion of the horizontal blanking period. Electric charges of an amount corresponding to one scanning line are sequentially transferred by the horizontal shift register 4 to the horizontal direction. An output circuit unit 5 is provided at the final end portion of the horizontal shift register 4. This output circuit unit 5 is formed of a FDA (floating diffusion amplifier) or the like and outputs the electric charges photoelectrically-converted by the light sensing units 1 in the converted form of a voltage.

FIG. 2 shows in sectional form a structure of a transfer electrode unit of the horizontal shift register 4 in the CCD image sensing device. As is apparent from FIG. 2, each of a plurality of transfer electrodes 6 in the horizontal shift register 4 is constructed by an electrode pair formed of a storage (ST) gate electrode 7 and a transfer (TR) electrode 8 of a double layer structure made of polysilicon. These electrode pairs are driven in two-phase fashion by the application of two-phase transfer clocks $H\phi 1$ and $H\phi 2$ of the same phase.

FIG. 4 shows a potential diagram of the horizontal shift register 4 at a timing point $t_0$ of FIG. 3. A potential difference $\Delta \phi 1$ in FIG. 4 is generated by injecting P ions only to the transfer gate electrode 8 in an ion-imlantation technique. Thus electric charge amount $Q_H$ of the horizontal shift register 4 is determined, whereas $\Delta \phi 2$ in FIG. 4 represents a potential difference between clocks of different phases. This potential difference $\Delta \phi 2$ influences the transfer efficiency of the horizontal shift register 4. Further, $(\Delta \phi 1 + \Delta \phi 2)$ is determined by a peak value Ha of the transfer clocks $H\phi 1$ and $H\phi 2$ shown in a waveform diagram of FIG. 3.

Recently, it is to be appreciated that the peak value Ha of the transfer clocks $H\phi 1$ and $H\phi 2$ tends to decrease in accordance with the decrease of the level of voltage applied to the transfer electrode 6. Since the peak value Ha is decreased, a sufficient potential difference $(\Delta \phi 1 + \Delta \phi 2)$ cannot be obtained and it becomes impossible to obtain the potential difference $\Delta \phi 1$ which can satisfy both the electric charge amount $Q_H$ and the transfer efficiency of the horizontal shift register 4. In other words, if the transfer efficiency of the horizontal shift register 4 is satisfied, then the peak value Ha of the transfer clock is lowered, resulting in the electric charge amount $Q_H$ of the horizontal shift register 4 being decreased.

OBJECTS AND SUMMARY OF THE INVENTION

Accordingly, it is an object of the present invention to provide an improved solid state image sensing device in which the aforesaid shortcomings and disadvantages encountered with the prior art can be eliminated.

More specifically, it is an object of the present invention to provide a solid state image sensing device in which a transfer efficiency of a horizontal shift register can be improved without decreasing an electric charge amount of the horizontal shift register.

Another object of the present invention is to provide a solid state image sensing device suitable for the case when a peak value of a transfer clock signal is lowered.

As a first aspect of the present invention, a solid state image sensing device is comprised of a plurality of light sensing units arranged at the pixel units in the vertical and horizontal directions in a two-dimensional array fashion. A vertical transfer unit transfers electric charges read out from the plurality of light sensing units at every vertical column in the vertical direction. A horizontal transfer unit having a plurality of transfer electrodes, each formed of an electrode pair of a storage gate electrode and a transfer electrode and driving the plurality of transfer electrodes in two-phase fashion by the application of the transfer clocks of the same phase to the electrode pair to thereby transfer the electric charges of the vertical transfer unit in the horizontal direction. The transfer clocks of the same phase are directly applied to the transfer gate electrode and are also applied to the storage gate electrode via resistors.

In the solid state image sensing device according to the present invention, since the transfer clocks of the same phase are directly applied to the transfer gate electrode and are also applied to the storage gate electrode via the resistors, the change of the potential in the storage gate electrode is delayed a little from that in the transfer gate electrode, resulting in the potential difference $\Delta \phi 2$ between the clocks of different phases being increased. Therefore, the transfer efficiency of the horizontal shift register can be improved without decreasing the electric charge amount $Q_H$ dependent on a potential difference $\Delta \phi 1$, and which is treated by the horizontal shift register.

The preceding and other objects, features, and advantages of the present invention will become apparent in the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 5 shows in cross-section a structure of a transfer electrode unit of a horizontal shift register according to the present invention;

FIG. 5A shows choice of a width of a wiring pattern in order to provide a desired resistance for feeding storage gates in lieu of a discrete resistor;

FIG. 5B shows a difference in cross-sectional area of a wiring pattern for providing a desired resistance for feeding the storage gates in lieu of a discrete resistor;

FIG. 6 is a waveform diagram of two-phase clocks applied to a storage gate; and

DESCRIPTION OF THE PREFERRED EMBODIMENT

An embodiment of the solid state image sensing device according to the present invention will now be described in detail with reference to the drawings.

Figure 1:
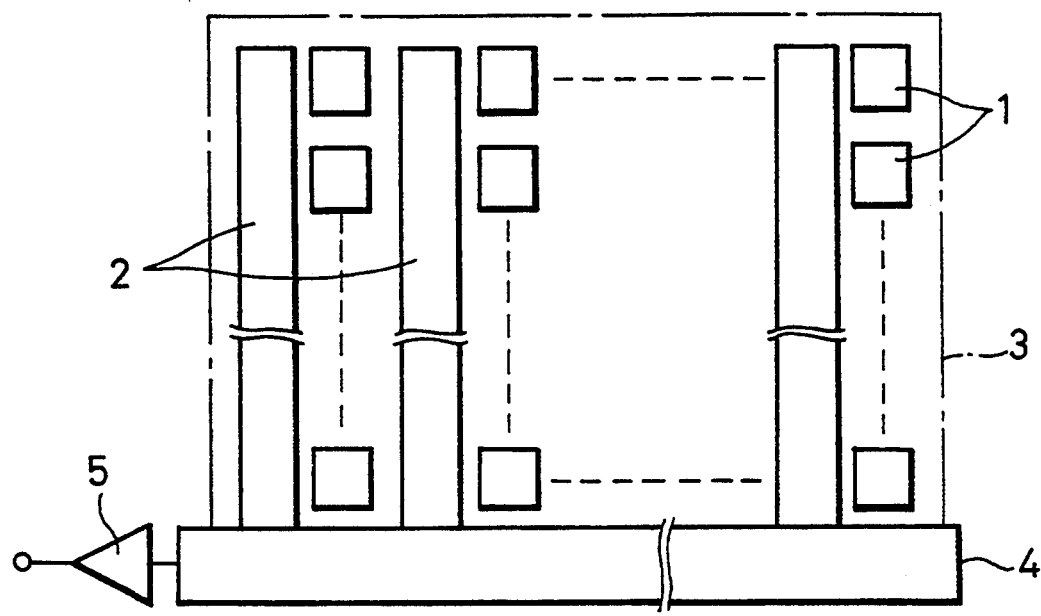
FIG. 1 is a schematic diagram showing a structure of a conventional CCD solid state image sensing device of an interline transfer system to which the present invention can be applied.
Figure 2:
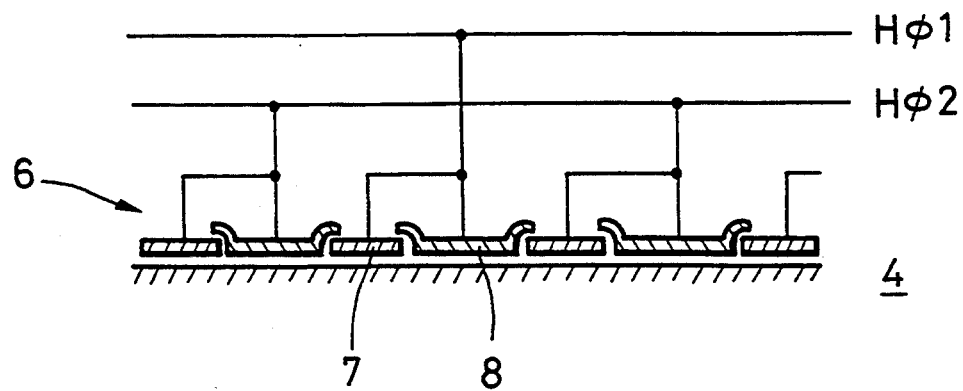
FIG. 2 is a cross-sectional view illustrating a structure of a transfer electrode unit of a horizontal shift register according to the prior art.
Figure 3:
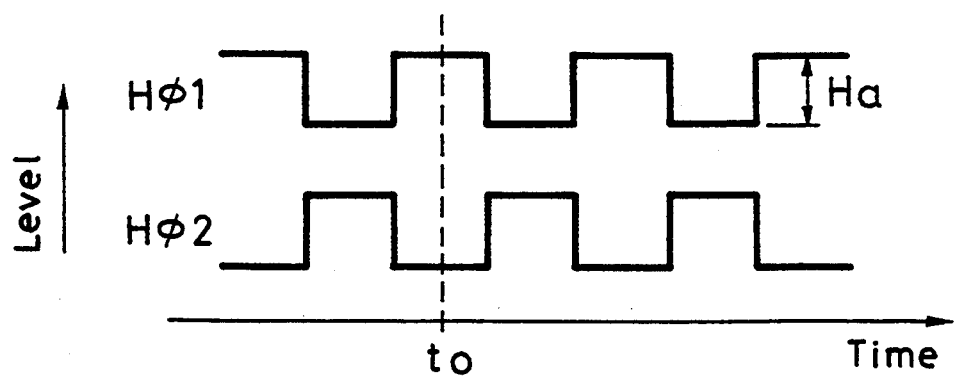
FIG. 3 is a waveform diagram of two-phase transfer clocks, and to which references will be made in explaining the prior art.
Figure 4:
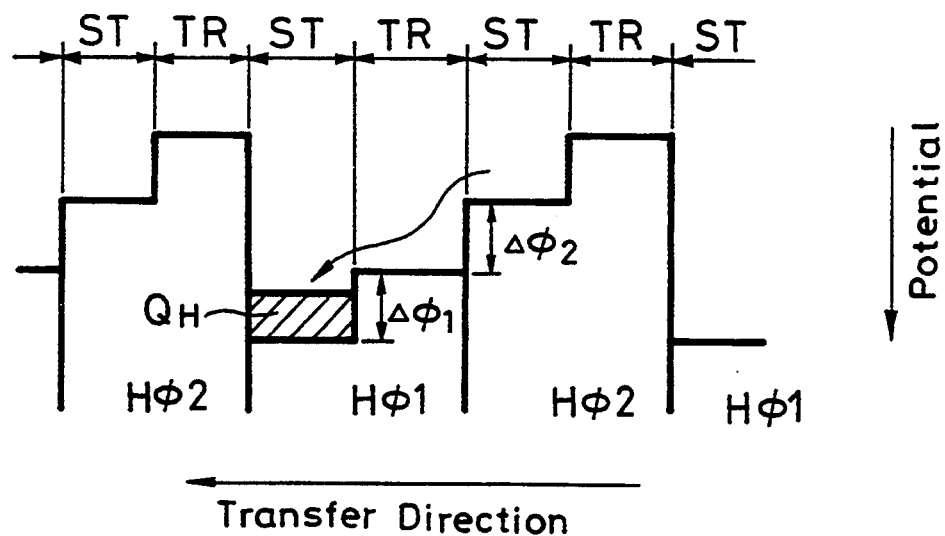
FIG. 4 is a potential diagram of the horizontal shift register at a timing point to in FIG. 3, and to which references will be made in explaining the prior art.

FIG. 5 is a cross-sectional view of a transfer electrode unit of a horizontal shift register according to an embodiment of the present invention. As is apparent from FIG. 5, a structure of the transfer electrode unit is the same as that of the prior art shown in FIG. 2. More specifically, each of a plurality of transfer electrodes 6 in the horizontal shift register 4 comprises a pair formed of a storage (ST) gate electrode 7 and the transfer (TR) gate electrode 8 of the double layer structure made of polysilicon.

In the above-mentioned electrode structure, the most specific feature of the present invention lies in how to apply two-phase transfer clocks H$\phi$1 and H$\phi$2 to the electrode pair of the storage gate electrode 7 and the transfer gate electrode 8. That is, as shown in FIG. 5, the two-phase transfer clocks H$\phi$1 and H$\phi$2 are applied to the electrode pair of the storage gate electrode 7 and the transfer gate electrode 8 by means of four bus lines $L_1$ to $L_4$. Resistors $R_{ST1}$, $R_{ST2}$ are respectively inserted into the bus lines $L_1$, $L_2$ for the storage gate electrode 7, whereby the two-phase transfer clocks H$\phi$1, H$\phi$2 are directly applied to the transfer gate electrode 8 and are also applied to the storage gate electrode 7 via the resistors $R_{ST1}$, $R_{ST2}$, respectively.

Since the resistors $R_{ST1}$, $R_{ST2}$ are respectively inserted into the bus lines $L_1$, $L_2$ for the storage gate electrode 7 as described above and a distributed capacity C exists in each of the bus lines, the distributed capacity C and the resistors $R_{ST1}$, $R_{ST2}$ constitute a delay system in the bus lines $L_1$, $L_2$. Due to the action of this delay system, the rise and fall response of the two-phase transfer clocks H$\phi$1 and H$\phi$2 applied to the storage gate electrode 7 become dull as shown in the waveform diagram forming FIG. 6, resulting in the potential of the storage gate electrode 7 being changed a little later than that of the transfer gate electrode 8.

Figure 7A:
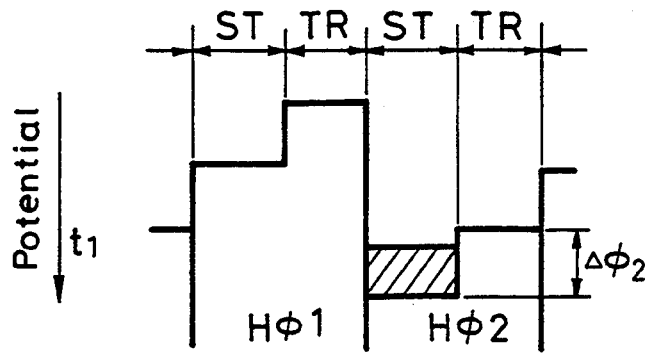
FIGS. 7A through 7C are respectively potential diagrams of the horizontal shift register at timing points $t_1$ to $t_3$ in the waveform diagram forming FIG. 6.
Figure 7B:
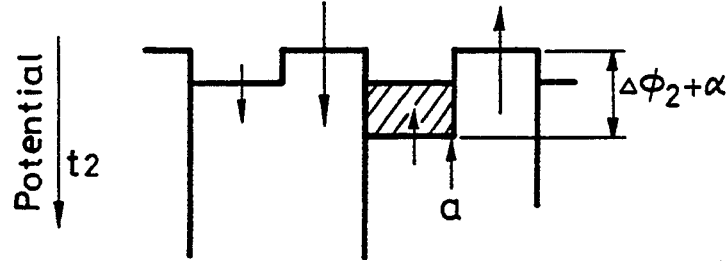
Figure 7C:
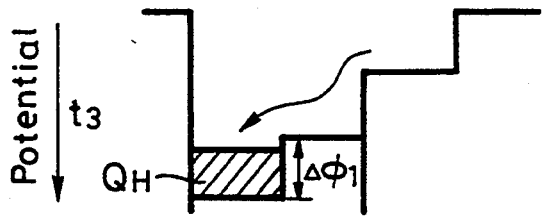

FIGS. 7A through 7C show potential diagrams of the horizontal shift register 4 at timing points $t_1$ to $t_3$ in the waveform diagram of FIG. 6, respectively.

At timing point $t_2$ in the transition period of the two-phase clocks H$\phi$1 and H$\phi$2, the change of the potential in the storage gate electrode 7 is delayed from that in the transfer gate electrode 8 by a small delay time so that the potential difference $\Delta\phi$2 between the clocks of different phases is increased by a predetermined value $\alpha$ as shown in FIG. 7B. As a consequence, an electric field of the innermost part (portion a in FIG. 7B) relative to the transfer direction of the storage gate electrode 7 is increased, thus making it possible to improve the transfer efficiency of the horizontal shift register 4. On the other hand, since the electric charge amount $Q_H$ treated by the horizontal shift register 4 depends upon the potential difference $\Delta\phi$1 shown in FIG. 7C, the electric charge amount $Q_H$ can be prevented from being decreased even by the resistors $R_{ST1}$, $R_{ST2}$ inserted in series into the bus lines $L_1$, $L_2$.

More specifically, since the resistors $R_{ST1}$, $R_{ST2}$ are respectively inserted in series into the bus lines $L_1$, $L_2$ of the storage gate electrode 7 and the change of the potential in the storage gate electrode 7 is delayed from that in the transfer gate electrode 8, it becomes possible to improve the transfer efficiency of the horizontal shift register 4 without decreasing the electric charge amount $Q_H$ dependent on the potential difference $\Delta\phi$1 and which is handled by the horizontal shift register 4.

While the four bus lines $L_1$ through $L_4$ are provided and the resistors $R_{ST1}$ and $R_{ST2}$ are respectively inserted in series into the bus lines $L_1$ and $L_2$ for the storage gate electrode 7 as described above, the present invention is not limited thereto and a variant also is possible such that two bus lines are utilized and the resistors $R_{ST1}$ and $R_{ST2}$ are inserted into the electrode portion of the storage gate electrode 7. In that case, resistance values of the resistors $R_{ST1}$ and $R_{ST2}$ must be increased considerably, which is possible from a theory standpoint, regardless of difficulties from a patterning-process standpoint. Such variations can achieve similar effects as those of the above-mentioned embodiment.

Furthermore, while the resistors $R_{ST1}$ and $R_{ST2}$ are generally connected as external resistors, the present invention is not limited to the external resistors, and resistances may be obtained by designing, for example, the width of a wiring pattern (FIG. 5A), its cross-sectional area (FIG. 5B) or the like. In short, it is sufficient that resistances may be provided so as to cooperate with the distributed capacity C in the bus line to construct the delay system for the transfer clocks H$\phi$1 and H$\phi$2 applied to the storage gate electrode 7.

As set out above, in the solid state image sensing device according to the present invention, since the transfer clocks of the same phase are directly applied to the transfer gate electrode and are also applied to the storage gate electrode via the resistors, the change of the potential in the storage gate electrode is delayed a little from that in the transfer gate electrode, resulting in the potential difference $\Delta\phi$2 between the clocks of different phases being increased. Therefore, the transfer efficiency of the horizontal shift register can be improved without decreasing the electric charge amount $Q_H$ treated by the horizontal shift register, so that the solid state image sensing device of the present invention becomes sufficiently useful when the peak value Ha of the transfer clock is lowered.

Although a preferred embodiment of the invention has been described with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed:

1. A solid state image sensing device, comprising:
   a plurality of light sensing units arranged at pixel units in vertical and horizontal directions in a two-dimensional array;
   a vertical transfer means for transferring electric charges read out from said plurality of light sensing units at vertical columns in the vertical direction; and
   a horizontal transfer means having a plurality of transfer electrode pairs with each pair formed of a storage gate electrode and a transfer gate electrode, and means for driving said plurality of transfer electrode pairs in a two-phase fashion by first and second phase transfer clock lines, the first transfer clock line being connected to some of the transfer electrode pairs and the second transfer clock line being connected to other of the transfer electrode pairs for transferring electric charges from said vertical transfer means in the horizontal direction, and wherein for each transfer electrode pair, the corresponding transfer clock line is directly connected to said transfer gate electrode and is indirectly connected to said storage gate electrode by delay means for delaying said transfer clock signals to said storage gate electrode.

2. A device according to claim 1 wherein said delay means comprises a resistor connected between the corresponding transfer clock line and corresponding storage gate electrodes along with a respective distributed capacitance associated with said transfer clock line.

3. A device according to claim 1 wherein said delay means comprises selecting a geometry of a portion of the respective transfer line leading to the respective storage gate electrodes to provide a resistance of desired value together with a distributed capacity of the transfer line leading to the respective storage gate electrodes.

4. A device according to claim 3 wherein the geometry of the transfer line is chosen to provide a desired resistance by an appropriate width of the bus line.

5. A device according to claim 3 wherein the resistance is determined by an appropriate cross-sectional area of the transfer line leading to the corresponding storage gate electrodes.

6. A device according to claim 1 wherein the delay means comprises a resistance and a capacitance associated with the transfer clock line feeding the respective storage gate electrodes.

7. A solid state image sensing device, comprising:
   a plurality of light sensing units arranged at pixel units in vertical and horizontal directions in a two-dimensional array;
   a vertical transfer means for transferring electric charges read out from said plurality of light sensing units at vertical columns in the vertical direction; and
   a horizontal transfer means having a plurality of transfer electrode pairs with each pair formed of a storage gate electrode and a transfer gate electrode, and means for driving said plurality of transfer electrode pairs in a two-phase fashion by first and second phase transfer clock lines, the first transfer clock line being connected to some of the transfer electrode pairs and the second transfer clock line being connected to other of the transfer electrode pairs for transferring electric charges from said vertical transfer means in the horizontal direction, and wherein for each transfer electrode pair, the corresponding transfer clock line is connected to said transfer gate electrode, and is also connected to said storage gate electrode by delay means for delaying transfer clock signals to said storage gate electrode relative to transfer clock signals applied to said transfer gate electrode.

* * * * *